United States Patent [19]

Geck

[11] Patent Number: 4,893,014

[45] Date of Patent: Jan. 9, 1990

[54] MOVEMENT MONITOR HAVING AN INFRARED DETECTOR

[75] Inventor: Berthold Geck, Altena, Fed. Rep. of Germany

[73] Assignee: Asea Brown Boveri Aktiengesellschaft, Mannheim, Fed. Rep. of Germany

[21] Appl. No.: 283,225

[22] Filed: Dec. 12, 1988

[30] Foreign Application Priority Data

Dec. 11, 1987 [DE] Fed. Rep. of Germany ....... 3742031

[51] Int. Cl.[4] ............................................. G01J 5/08

[52] U.S. Cl. .................................. 250/353; 250/342; 340/567

[58] Field of Search ................ 250/353, 342; 340/567, 340/600

[56] References Cited

U.S. PATENT DOCUMENTS 4,772,797 9/1988 Kahl et al. .......................... 356/310

4,790,654 12/1988 Clarke ................................ 250/342

*Primary Examiner*—Janice A. Howell

*Assistant Examiner*—Richard Hanig

*Attorney, Agent, or Firm*—Herbert L. Lerner; Laurence A. Greenberg

[57] ABSTRACT

Movement monitors with segmented collecting optics have dead zones between the individual focusing segments, in which a radiating object can stay without tripping a signal. These dead zones are to be practically avoided with the movement monitor according to the invention. To this end, deflecting optics after the collecting optics in each case deflect a portion of the bundle of rays incident parallel to the principal ray of a segment in such a way that at least two radiation maxima occur. Given a corresponding change in position of a radiating object, these radiation maxima strike sensor elements of the sensor one after another. In this way, dead zones are reduced to such an extent that they are practically eliminated. The movement monitor serves for zonal monitoring inside and outside buildings. By transmitting a signal, it can switch on lighting or trip an alarm.

20 Claims, 2 Drawing Sheets

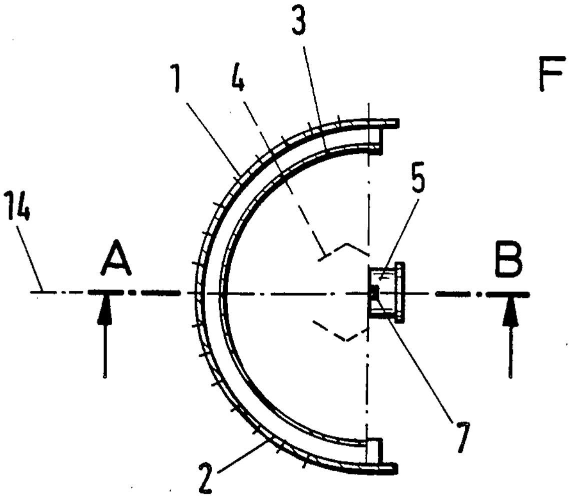
Fig.1
Fig.3
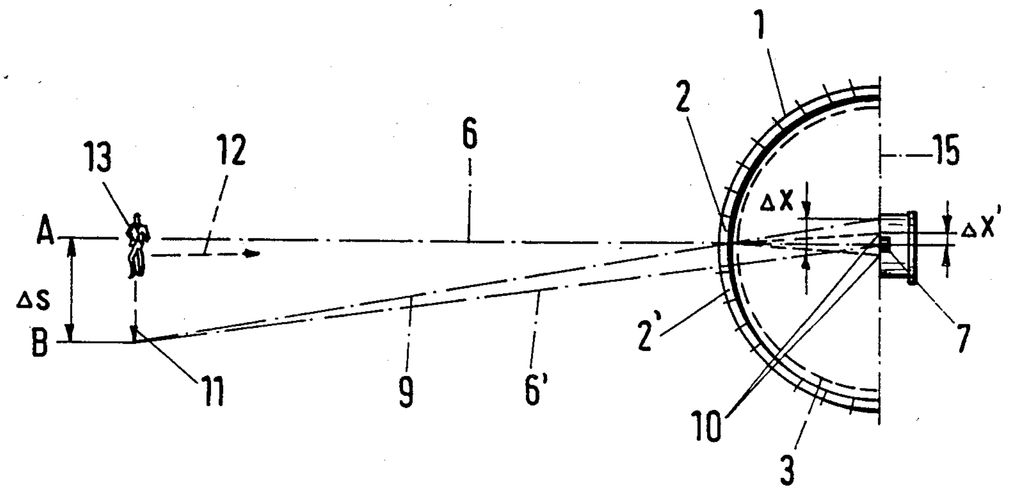

MOVEMENT MONITOR HAVING AN INFRARED DETECTOR

SPECIFICATION:

The invention relates to a movement monitor having an infrared detector focusing thermal radiation picked up from a monitored zone onto at least one sensor with the aid of collecting optics, the sensor being sensitive in the infrared band and transmitting a signal tripping a switching function, given a predetermined change in the received infrared radiation, the collecting optics being formed of an axially segmented cylindrical section, each segment effecting a focusing having its principal ray directed onto the sensor.

Movement monitors with infrared detectors are enjoying increasing popularity in zonal monitoring, both inside and outside buildings. As passive detectors, they react directly to radiating objects which emit thermal radiations. Another example of such a radiating object is a person who intrudes into a zone to be monitored. There is consequently no need for an additional transmitter such as is required with movement monitors of a different type. A further advantage is that modern infrared detectors facilitate a large coverage, reaching up to 180°, so that a detector fixed to a wall can cover a wide solid angle lying in front of the wall.

Published European application No. EP-A2-0 113 468 discloses an infrared detector which, with the aid of collecting optics, focuses thermal radiation picked up from a monitored zone onto a sensor which is sensitive in the infrared band. The collecting optics are formed of a multiplicity of mutually interconnected individual collector lenses, disposed in a semicircle round the detector. In this way, each individual collector lens forms a strip-shaped segment of an axially segmented cylindrical section. In that configuration, the collector lenses have the structure of a Fresnel lens, so that a wide coverage is guaranteed not only in a radial direction relative to the cylindrical collecting optics, but also axially along the strip-shaped collector lens.

A distinguishing feature of the infrared detector according to the above-mentioned publication is that on one hand, two mutually offset mirrors in the vicinity of the optical axis of the collecting optics pass incident rays directly to the sensor but on the other hand, they deflect the rays at a greater distance from the optical axis so that they strike the sensor at a more acute angle relative to the optical axis. The advantage of such a structure is that the sensor, which attains its highest sensitivity for vertically incident radiation, also assesses the very obliquely incident rays, i.e. those at up to 90° relative to the optical axis, with approximately the same sensitivity.

If a detector of the type described above is mounted on a wall so that the axis of the cylindrical collecting optics is vertically aligned, then it will be able to monitor at least the plane extending horizontally before it as far as the wall to which it is attached. If a radiating object is located in the monitored zone, it can be registered by the sensor only if it is located in the region of the principal ray of one of the collector lenses, since only a bundle of rays parallel to the principal ray will be focused by the particular collector lens onto the sensor. The bundles of rays that are proceeding from the radiating object but are covered by the other collector lenses, produce further focal points which fall in the same focal plane in which the sensor is also disposed but nevertheless become more distant from the center point of the sensor with an increase in the angle of incidence, which the bundle of rays forms with the principal ray of the particular lens.

If the radiating object moves at ground level parallel to the wall of the detector or tangentially to the cylindrical collecting optics, the focal points of the individual segments also move along the focal plane along a straight line, which runs through the sensor. As soon as the radiating object reaches the principal ray of the next segment, its focal point falls onto the sensor, and this is repeated in each case in both directions as far as the last segment lying nearest the wall. On each occasion that a focal point strikes the active crystal facet of a sensor and also as soon as the focal point once again leaves the crystal facet after having traversed it, an electrical signal is produced which can be used as switching signal. With these switching signals it is possible to drive an alarm system or, if necessary, it is also possible to switch on the lighting of a zone.

If a radiating object enters the monitored zone in the radial direction relative to the cylindrical collector lens, it could move along a straight line lying as bisector between the principal rays of two adjacent segments. In this case, it is to be assumed that none of the two focal points of these segments falls on the sensor, so that no signal can be produced either.

It is accordingly an object of the invention to provide a movement monitor having an infrared detector, which overcomes the hereinafore-mentioned disadvantages of the heretofore-known devices of this general type, to do so in such a way that a practically uninterrupted zonal monitoring can take place and especially so as to cover even those movements of a radiating object which are directed straight at or away from the movement monitor.

With the foregoing and other objects in view there is provided, in accordance with the invention, a movement monitor having an infrared detector, comprising collecting optics focusing thermal radiation picked up from a radiating object in a monitored zone, at least one sensor being sensitive in the infrared band, the at least one sensor receiving the focused thermal radiation from the collecting optics and transmitting a signal upon a predetermined change in infrared radiation received by the at least one sensor for tripping a switching function, the collecting optics being formed of a cylindrical section being axially divided into segments each effecting focusing with a principal ray directed onto the at least one sensor, and deflecting optics upstream or downstream of the collecting optics deflecting a portion of each bundle of rays incident parallel to the principal ray of a segment and forming at least two radiation maxima striking the at least one sensor one after another upon the occurrence of a corresponding change in the position of the radiating object.

One could envisage achieving the object of the invention by increasing the number of the focusing elements, in order to obtain more focal points or more densely sequenced focal points. However, this would further complicate the collecting optics which are already difficult to manufacture, and would lead to especially expensive tools.

The structure for achieving the object of the invention has the advantage that already existing collecting optics can be further employed without change and that only additional deflecting optics must be inserted. Various alternatives, which are relatively simple to execute, are suggested for achieving the realization of the deflecting optics.

In accordance with another feature of the invention, the radiation maxima are punctiform, annular or strip-shaped and are preferably substantially equally spaced apart.

The shape of the radiation maxima is unimportant as long as it is ensured that they strike the sensor one after another. With punctiform and strip-shaped radiation maxima this occurs in any case as soon as an optically active spacing occurs between them. With annularly disposed radiation maxima, the diameter of the rings must be relatively large in relation to the active surface of the sensor.

In accordance with a further feature of the invention, the at least one sensor has at least two sensor elements being spatially separated from one another and electrically connected with one another.

The number of pulses which can be achieved per segment of the collecting optics, can be increased not only with additional radiation maxima, but also with several sensor elements that are spatially separated from one another and assigned to a sensor. In each case, a sensor element is to be understood as an actively effective area of a sensor, for example a lithium tantalate crystal. If the sensor elements are interconnected electrically, each radiation maximum once again generates a signal upon entry and exit at the subsequent sensor element, after it has passed through the gap between two sensor elements.

In accordance with an added feature of the invention, the sensor elements are electrically connected in series, preferably in an antipolar fashion.

The sensor elements are normally connected in series, with an antipole series connection also being possible in an exceptional situation. Due to the antipolarity, signals of different polarity are generated in each case, so that the total amplitude between the amplitude peaks rises to twice the value. Such configurations are also used to form differences, which makes it possible to feed to the two sensor elements rays from different segments of the collecting optics, and therefore also from different regions of the monitored zone, in order to eliminate generally operative sources of radiation in this way such as insulation, for example. In connection with the above, it ought to be ensured that in each case only one radiation maximum strikes one of the two sensor elements at the same time, so that their signals are not mutually compensated.

In accordance with an additional feature of the invention, the spacing between the radiation maxima and the surface areas of the sensor elements cause at least most or all of the maxima to trip a separate signal when striking and exiting from one of the sensor elements, starting from a predetermined amplitude. It is therefore seen that in order to guarantee a quasi-uninterrupted monitoring, it is advantageous to optimize the spacing between the radiation maxima on the one hand, and the spacing and the width of the sensor elements, on the other hand, in such a way that, from a predetermined amplitude, preferably each maximum trips a separate signal in each case when striking and exiting from one of the sensor elements. A dense sequencing of the individual maxima ensures that each movement in the tangential direction leads to a signal at the sensor. Since it is not possible in practice to execute a radial movement entirely without tangential components, because the rolling gait of a person is enough to cause such a component, the movement monitor will also certainly detect such components.

In accordance with yet another feature of the invention, the segments of the collecting optics are lenses, preferably Fresnel lenses, and there are provided mirrors deflecting certain rays.

If necessary, the collecting optics may be mirrors to be inserted, which serve to deflect at least a portion of the rays. The Fresnel lens represents an especially expedient collector lens, because it facilitates a wide coverage, which extends especially in the vertical direction with a movement monitor of the present type.

In accordance with yet a further feature of the invention, there is provided a surface coaxial to the cylindrical collecting optics, the deflecting optics being formed of a diffraction grating disposed on the surface. This provides a simple construction of the deflecting optics, with the diffraction grating being positioned concentric to the sensor, like the collecting optics.

In accordance with yet an added feature of the invention, the diffraction grating has a fixed predetermined number of grating slits or grating holes assigned to each segment of the collecting optics. The geometry of the diffraction grating is determined by the number and the spacing of the individual radiation maxima. Therefore, for the purpose of optimization, a fixed predetermined number of grating slits (groove grating) or grating holes (cross grating) is assigned to each segment of the collecting optics.

In accordance with yet an additional feature of the invention, there is provided a surface coaxial to the cylindrical collecting optics, the deflecting optics being formed of a diffracting screen disposed on the surface having screen elements in the form of thin filaments or wires or cutouts.

A deflection corresponding to the diffraction grating can also be achieved in this way at a surface concentric to the collecting optics. In this case, slits are replaced by bars or fine wires, which facilitate the generation of radiation maxima through diffraction in the same way.

In accordance with still another feature of the invention, a fixed predetermined number of screen elements is assigned to each segment of the collecting optics.

In accordance with still a further feature of the invention, there is provided at least one or several diffracting element inserted as deflecting optics into the ray path between the collecting optics and the at least one sensor for at least several or all of the segments of the collecting optics in common.

It is thus seen that a further alternative for generating several radiation maxima results if one or several diffracting elements, which serve as deflecting optics and are no longer assigned to the individual segments of the collecting optics but to the sensor, are introduced into the common ray path of all or at least several segments of the collecting optics, immediately before the sensor. This may necessitate changing the location of the focal point in relation to the sensor, so that the focal point comes to lie in the region of the deflecting optics.

In accordance with a concomitant feature of the invention, there is provided a masking element inserted into the ray path between the collecting optics and the at least one sensor, the masking element suppressing the rays emanating from a segment inside a central sub-area of a sensor element for at least several segments of the collecting optics in common.

As already explained, the number of the signals per segment of the collecting optics can be increased through the number of the sensor elements. A similar effect can be achieved through the optical splitting of a relatively large active sensor element by interrupting the ray path between the collecting optics and the sensor with a masking element. If the interruption is effected in such a way that the rays before and after the screen fall onto a sub-area of the sensor element in each case, then the number of the signals is doubled.

Other features which are considered as characteristic for the invention are set forth in the appended claims.

Although the invention is illustrated and described herein as embodied in a movement monitor having an infrared detector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a top-plan view of a detector looking towards the upper edge of collecting optics and of a diffraction grating;

FIG. 3 is a view similar to FIG. 1 including the ray path before and inside the detector for movements of a radiating object in the tangential direction.

Figure 2:
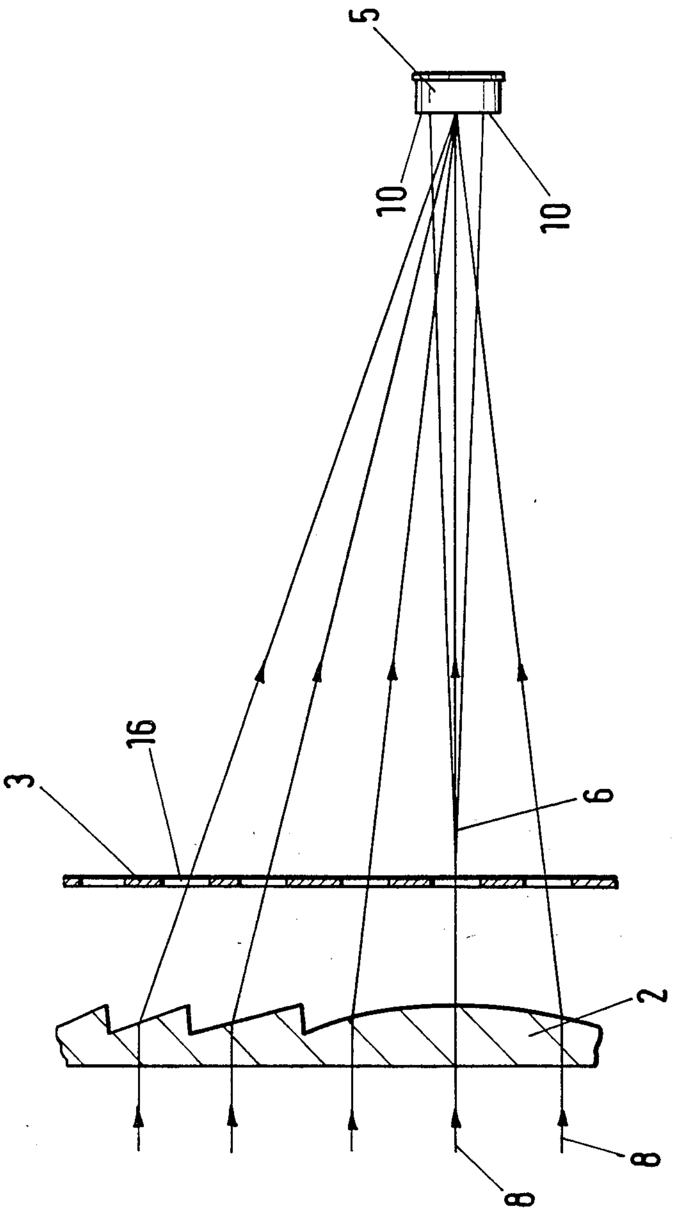
FIG. 2 is an enlarged, fragmentary, lateral sectional view of the detector taken along the section line A-B according to FIG. 1, in the direction of the arrows.

Referring now to the figures of the drawings in detail and first, particularly, to FIG. 1 thereof, there is seen a detector formed of collecting optics or an optical system or objective lens system 1, a diffraction grating 3, mirrors 4 and a sensor 5. The collecting optics 1 are segmented in the vertical direction or axially so that each segment 2 forms its own collector lens, which focuses all the rays incident parallel to its principal ray onto a focal point, in a plane in which the sensor 5 is disposed. In this connection, the two mutually offset mirrors 4 assume a purely auxiliary function. They serve to deflect rays striking the sensor, which are incident at an angle of approximately 45° to 90° to the optical axis 14 of the sensor, so that they strike a sensor element 7 of the sensor 5 almost perpendicularly, but at least at a more acute angle to the optical axis 14. Since the mirrors 4 are not important in connection with the present invention, but merely complicate the representation of the ray path, they are not considered within the framework of the further description.

The representation in FIG. 2 is provided in order to illustrate in principle the mode of operation of the diffraction grating 3. It is assumed that it deals with a diffraction grating 3 having a multiplicity of slits 16 disposed in parallel. Parallel rays 8 which are incident parallel to a principal ray 6 from a correspondingly far removed radiating object are focused by a Fresnel lens 2. After exiting from the Fresnel lens 2, the rays 8 strike the diffraction grating 3, and a diffraction takes place in a known manner at each slit 16. In this way, further radiation maxima 10 are produced in addition to the focal point, which lies on the principal ray 6.

A two-dimensional cross grating, having a known diffraction spectrum, can also be employed as the diffraction grating.

If, as represented in FIG. 3, a radiating object 13 moves tangentially relative to the cylindrically curved collecting optics 1, the focal points of all of the segments 2 of the collecting optics also move along a focal plane 15, as soon as they detect a portion of the radiation emitted from the radiating object 13. In order to illustrate this process, a representation is first given of a principal ray 6, which traverses a segment 2 disposed symmetrically relative to the optical axis, and strikes the sensor element 7 of the sensor 5 in an unbroken manner. All of the rays parallel to the principal ray 6 produce a common focal point in this case.

If, however, the radiating object 13 moves from a position A to a position B, an angular ray 9 arises, which is incident at an acute angle relative to the principal ray of the segment 2 and which, although deflected by the segment 2 towards the sensor element 7, no longer strikes the element 7. That is to say, the focal point of the rays incident to the segment 2 has moved out of the sensor element 7. Moreover, a signal has been produced in connection with the exiting from the sensor element 7. A further signal is produced since the radiating object 13 in the position B reaches the principal ray 6' of the adjacent segment 2' so that its focal point falls on the sensor element 7.

If the radiating object 13 were to continue its path in the same direction, then after a certain distance s it would strike the principal ray of the subsequent segment having a focal point which would come to lie on the sensor element 7, while the focal point of the preceding segment 2' would once again move out of the region of the sensor element 7. The same process is repeated along the entire collecting optics.

The provision of a coverage which is as uninterrupted as possible, requires that the tangential path length Δ S which the radiating object 13 has to traverse in order to trip a renewed signal at the sensor 5, be as short as possible, because for a very short Δ S it can be assumed that a recordable tangential movement 11 also takes place in association with a radial movement 12.

A signal is produced at the sensor 5 whenever a radiation maximum moving along the focal plane 15 strikes or leaves a sensor element. In the absence of deflecting optics, the spacing Δ X between the focal points of two segments 2 determines the path length Δ S. For optical conditions which are otherwise the same, the critical path length Δ S can be reduced by decreasing the spacing between two consecutive radiation maxima. With regard to the total coverage of the collecting optics, this results in an increase in the number of the radiation maxima, with an approximately equal spacing between the radiation maxima being assumed.

Since enhanced segmentation of the collecting optics 1 places limits on how far the radiation maxima can be increased, this can be achieved in a simple fashion with a diffraction grating 3, which is disposed after or downstream of the collecting optics 1. It is certainly true that the diffraction grating, which is preferably to be provided with diffraction slits could, in principle, also be disposed before or upstream of the collecting optics 1, but when it is after the collecting optics it is particularly protected against contamination.

The effect of the diffraction grating is that the focal points of all heat rays incident in parallel through the segments 2 are split up, as it were, into several radiation maxima, so that in this way the number of the radiation maxima is multiplied. Only two further radiation maxima 10, lying symmetrical to the principal ray 6, are shown in FIG. 3. However, it can be seen that this already causes the spacing between two adjacent radiation maxima to be decreased to Δ X'. In this way the critical path length Δ S is also reduced, but this is not shown. Moreover, it is to be assumed that as the radiating object 13 approaches the collecting optics 1, the diffraction is somewhat altered and that consequently the radiation maxima are additionally displaced somewhat further.

No detailed representation of the remaining alternative methods of achieving the object of the invention will be explained with the aid of drawings, since the essential facts previously described apply to the other embodiments as well.

The foregoing is a description corresponding in substance to German application No. P 37 42 031.3, dated Dec. 11, 1987, the International priority of which is being claimed for the instant application, and which is hereby made part of this application. Any material discrepancies between the foregoing specification and the aforementioned corresponding German application are to be resolved in favor of the latter.

I claim:

1. Movement monitor having an infrared detector, comprising collecting optics focusing thermal radiation picked up from a radiating object in a monitored zone, at least one sensor being sensitive in the infrared band, said at least one sensor receiving the focused thermal radiation from said collecting optics and transmitting a signal upon a predetermined change in infrared radiation received by said at least one sensor for tripping a switching function, said collecting optics being formed of a cylindrical section being axially divided into segments each effecting focusing with a principal ray directed onto said at least one sensor, and deflecting optics in the vicinity of said collecting optics deflecting a portion of each bundle of rays incident parallel to the principal ray of a segment and forming at least two radiation maxima striking said at least one sensor one after another upon the occurrence of a corresponding change in the position of the radiating object.

2. Movement monitor according to claim 1, wherein said deflecting optics are disposed upstream of said collecting optics, as seen in radiation direction of the rays.

3. Movement monitor according to claim 1, wherein said deflecting optics are disposed downstream of said collecting optics, as seen in radiation direction of the rays.

4. Movement monitor according to claim 1, wherein said deflecting optics are selected in order to form a radiation maxima which are punctiform.

5. Movement monitor according to claim 1, wherein said deflecting optics are selected in order to form a radiation maxima which are annular.

6. Movement monitor according to claim 1, wherein said deflecting optics are selected in order to form a radiation maxima which are strip-shaped.

7. Movement monitor according to claim 1, wherein said deflecting optics are selected in order to form a radiation maxima which are substantially equally spaced apart.

8. Movement monitor according to claim 1, wherein said at least one sensor has at least two sensor elements being spatially separated from one another and electrically connected with one another.

9. Movement monitor according to claim 8, wherein said sensor elements are electrically connected in series.

10. Movement monitor according to claim 8, wherein said sensor elements are electrically connected in series in an antipolar fashion.

11. Movement monitor according to claim 8, wherein the spacing between the radiation maxima and the surface areas of said sensor elements cause at least most of the maxima to trip a separate signal when striking and exiting from one of said sensor elements, starting from a predetermined amplitude.

12. Movement monitor according to claim 1, wherein said segments of said collecting optics are lenses, and including mirrors deflecting certain rays.

13. Movement monitor according to claim 1, wherein said lenses are Fresnel lenses.

14. Movement monitor according to claim 1, including a surface coaxial to said cylindrical collecting optics, said deflecting optics being formed of a diffraction grating disposed on said surface.

15. Movement monitor according to claim 14, wherein said diffraction grating has a fixed predetermined number of grating slits or grating holes assigned to each segment of said collecting optics.

16. Movement monitor according to claim 1, including a surface coaxial to said cylindrical collecting optics, said deflecting optics being formed of a diffracting screen disposed on said surface having screen elements in the form of thin filaments or wires.

17. Movement monitor according to claim 1, including a surface coaxial to said cylindrical collecting optics, said deflecting optics being formed of a diffracting screen disposed on said surface having screen elements in the form of cutouts.

18. Movement monitor according to claim 16, wherein a fixed predetermined number of screen elements is assigned to each segment of said collecting optics.

19. Movement monitor according to claim 1, including at least one diffracting element inserted as deflecting optics into the ray path between said collecting optics and said at least one sensor for at least several of said segments of said collecting optics in common.

20. Movement monitor according to claim 8, including a masking element inserted into the ray path between said collecting optics and said at least one sensor, said masking element suppressing the rays emanating from a segment inside a central sub-area of a sensor element for at least several segments of said collecting optics in common.

* * * * *